(12) United States Patent
Ling et al.

(10) Patent No.: US 6,701,768 B2
(45) Date of Patent: Mar. 9, 2004

(54) PROCESS FOR MAKING RATCHET WHEELS

(75) Inventors: David Ling, Taichung (TW); Hsien-Chung Tuan-Mu, Taichung (TW)

(73) Assignee: Hand Tool Design Corporation, Christiana, DE (US)

( * ) Notice: Subject to any disclaimer, the term of this patent is extended or adjusted under 35 U.S.C. 154(b) by 0 days.

(21) Appl. No.: 10/161,254

(22) Filed: May 31, 2002

(65) Prior Publication Data

US 2002/0148329 A1 Oct. 17, 2002

Related U.S. Application Data

(63) Continuation-in-part of application No. 09/820,061, filed on Mar. 28, 2001, now abandoned, which is a continuation-in-part of application No. 09/599,206, filed on Jun. 22, 2000, now abandoned.

(51) Int. Cl.[7] ............................................... B21D 22/00
(52) U.S. Cl. ............................. 72/356; 72/358; 72/377; 76/114; 76/119
(58) Field of Search ................................ 76/101.1, 114, 76/119; 72/356, 358, 377; 476/8; 81/121.1, 63.2

(56) References Cited

U.S. PATENT DOCUMENTS

| 2,769,360 A | 11/1956 | Cotrell et al. ............... 81/124.3 |
| 4,061,013 A * | 12/1977 | Kuc et al. ..................... 72/356 |
| 4,078,415 A * | 3/1978 | Koch et al. .................... 72/356 |
| 4,111,077 A | 9/1978 | Cummings et al. ............. 81/63 |
| 4,166,373 A * | 9/1979 | Braun ........................... 72/356 |
| 4,291,568 A * | 9/1981 | Stifano, Jr. .................... 72/356 |
| 4,722,252 A | 2/1988 | Fulcher et al. ............... 81/63 X |
| 5,542,320 A * | 8/1996 | Vasicek et al. ............... 76/114 |
| 5,782,148 A | 7/1998 | Kerkhoven ............... 81/186 X |
| 5,946,989 A | 9/1999 | Hsieh .......................... 81/124.3 |
| 5,983,758 A | 11/1999 | Tanner ....................... 81/124.3 |
| 6,390,929 B2 * | 5/2002 | Hyatt ............................. 470/8 |
| 6,422,053 B1 * | 7/2002 | Greuel et al. ................. 72/397 |
| 6,477,759 B2 * | 11/2002 | Hu ................................. 76/119 |
| 2003/0070512 A1 * | 4/2003 | Hu .............................. 81/63.2 |

FOREIGN PATENT DOCUMENTS

JP         55-24787   * 2/1980

* cited by examiner

*Primary Examiner*—Hwei-Siu Payer
(74) *Attorney, Agent, or Firm*—Nelson Mullins Riley & Scarborough, LLP

(57) ABSTRACT

A process for making ratchet wheels includes a step of providing a work with a first end and a second end, a step of punching the work by means of a punch so as to define a large recess through the second end, a step of cutting away the first end of the work, a step of defining two annular grooves in a periphery of the work and a step of forming a plurality of teeth on the work. The process may include, before the step of cutting away the first end of the work, a step of punching the work in order to define a small recess with a diameter smaller than that of the large recess, a step of punching the work so as to define an opening with a diameter smaller than that of the small recess wherein the opening extends through the first end of the work. The process may include a step of defining a shallow recess in the second end of the work before the step of defining the large recess.

13 Claims, 7 Drawing Sheets

PROCESS FOR MAKING RATCHET WHEELS

CROSS REFERENCE

This patent application is a continuation in part of patent application Ser. No. 09/820,061 filed on Mar. 28, 2001, now abandoned which is a continuation in part of patent application Ser. No. 09/599,206 filed Jun. 22, 2000, now abandoned.

BACKGROUND OF INVENTION

1. Field of Invention

The present invention relates to a process for making ratchet wheels.

2. Related Prior Art

Every year, a great number of hand tools are produced. Ratchet wrenches make a large proportion of these hand tools. A good ratchet wheel is essential for a ratchet wrench. Therefore, such ratchet wheels must be manufactured with care. People have been working hard for a more productive, precise and cost-effective process for making such ratchet wheels.

SUMMARY OF INVENTION

It is the primary objective of the present invention to provide a process for making ratchet wheels.

A process for making ratchet wheels includes a step of providing a work with a first end and a second end, a step of punching the work by means of a punch so as to define a large recess through the second end, a step of cutting away the first end of the work, a step of defining two annular grooves in a periphery of the work and a step of forming a plurality of teeth on the work.

The process may include, before the step of cutting away the first end of the work, a step of punching the work in order to define a small recess with a diameter smaller than that of the large recess, a step of punching the work so as to define an opening with a diameter smaller than that of the small recess wherein the opening extends through the first end of the work.

The process may include a step of defining a shallow recess in the first end of the work before the step of defining the large recess.

The process may include a step of defining a shallow recess in the second end of the work before the step of defining the large recess.

The annular grooves may be defined by means of a CNC lathe.

The teeth may be formed via cutting a number of grooves in the work.

The punch may include six corners, six facets separated from one another by means of the corners and six ridges each formed on one of the facets. The ridges are similar to the corners except for being shorter.

The punch includes four corners, four facets separated from one another by means of the corners and four ridges each formed on one of the facets. The ridges are similar to the corners except for being shorter.

The punch may include eleven long ridges and a short ridge evenly formed thereon.

The punch may include eight ridges evenly formed thereon.

The punch may include twelve ridges evenly formed thereon.

Other objects, advantages, and novel features of the invention will become more apparent from the following detailed description when taken in conjunction with the attached drawings.

BRIEF DESCRIPTION OF DRAWINGS

The present invention will be described through detailed illustration of embodiments referring to the attached drawings wherein.

DETAILED DESCRIPTION OF EMBODIMENTS

Figure 1:
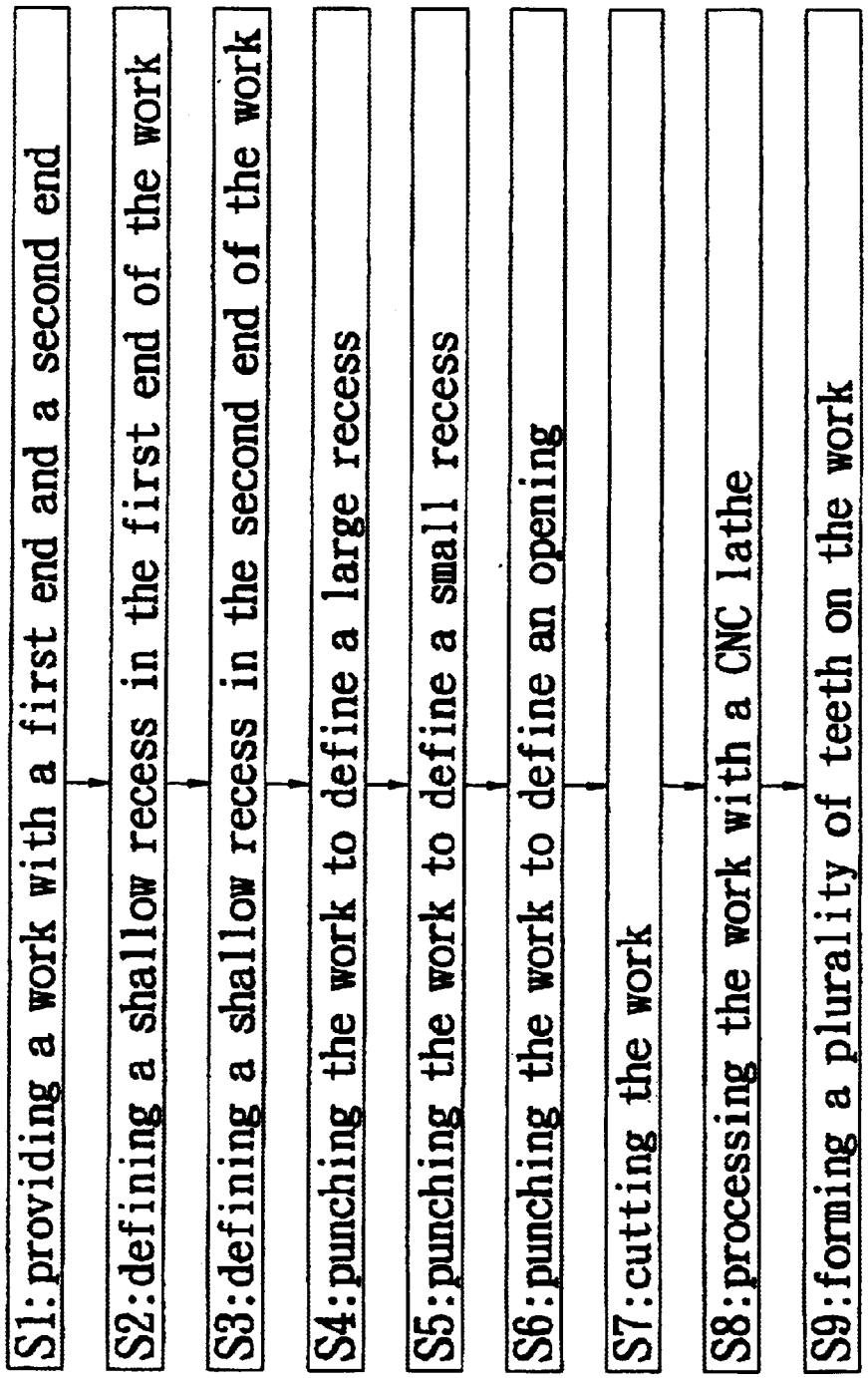
FIG. 1 is a flow chart of a process for making ratchet wheels according to the present invention.
Figure 2:
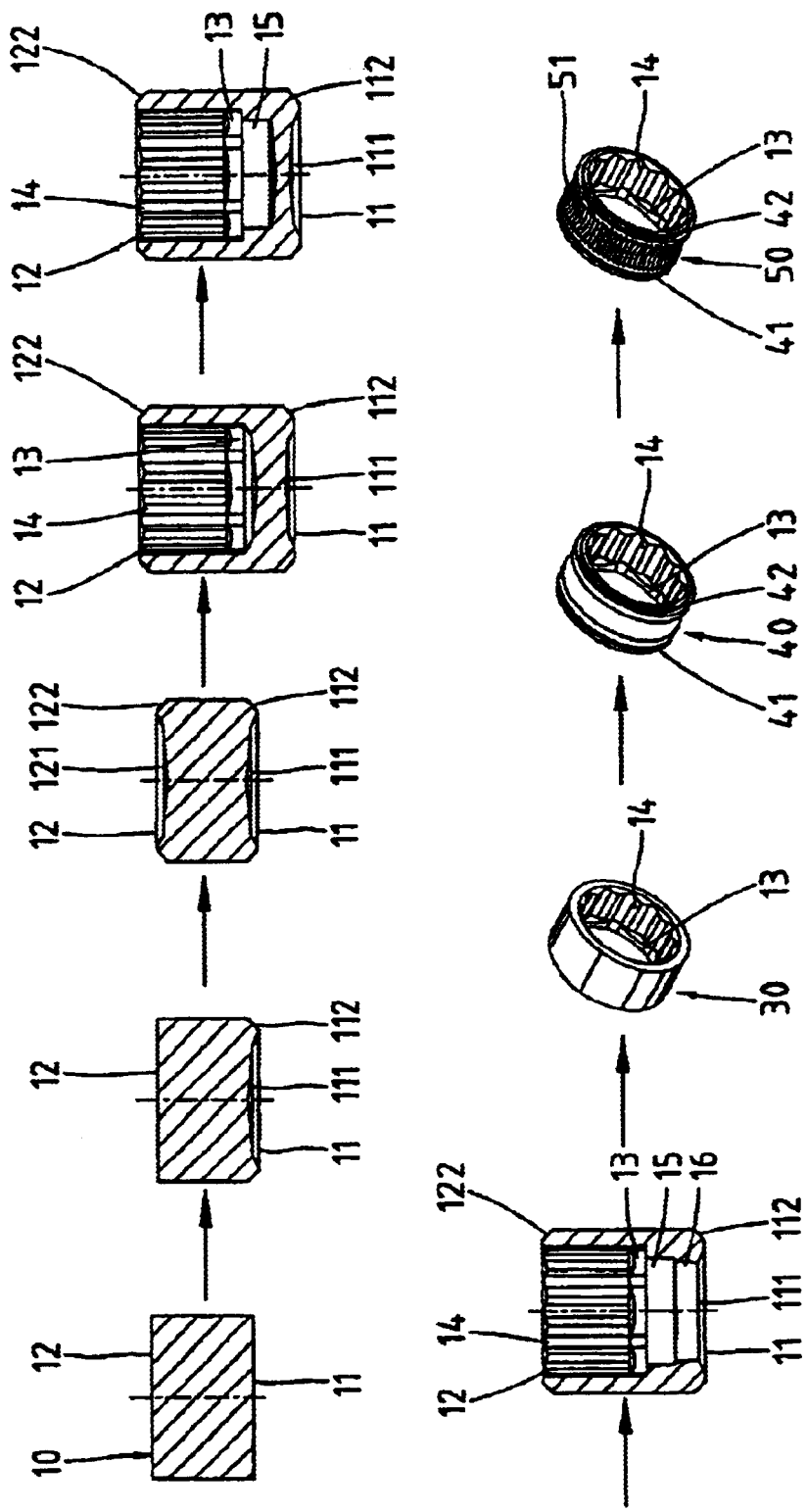
FIG. 2 shows a work in various steps of the process shown in FIG. 1.

FIG. 1 is a flow chart of a process for making ratchet wheels according to the present invention. FIG. 2 shows a work in various steps of the process shown in FIG. 1.

Referring to FIGS. 1 and 2, in step S1, a work 10 is provided. The work 10 includes a first end 11 and a second end 12.

In step S2, the work 10 is processed so as to define a shallow recess 111 in the first end 11 of the work 10 and to form a chamfer 112 at the first end 11 of the work 10.

In step S3, the work 10 is processed so as to define a shallow recess 121 in the second end 12 of the work 10 and to form a chamfer 122 at the second end 12 of the work 10.

Figure 3:
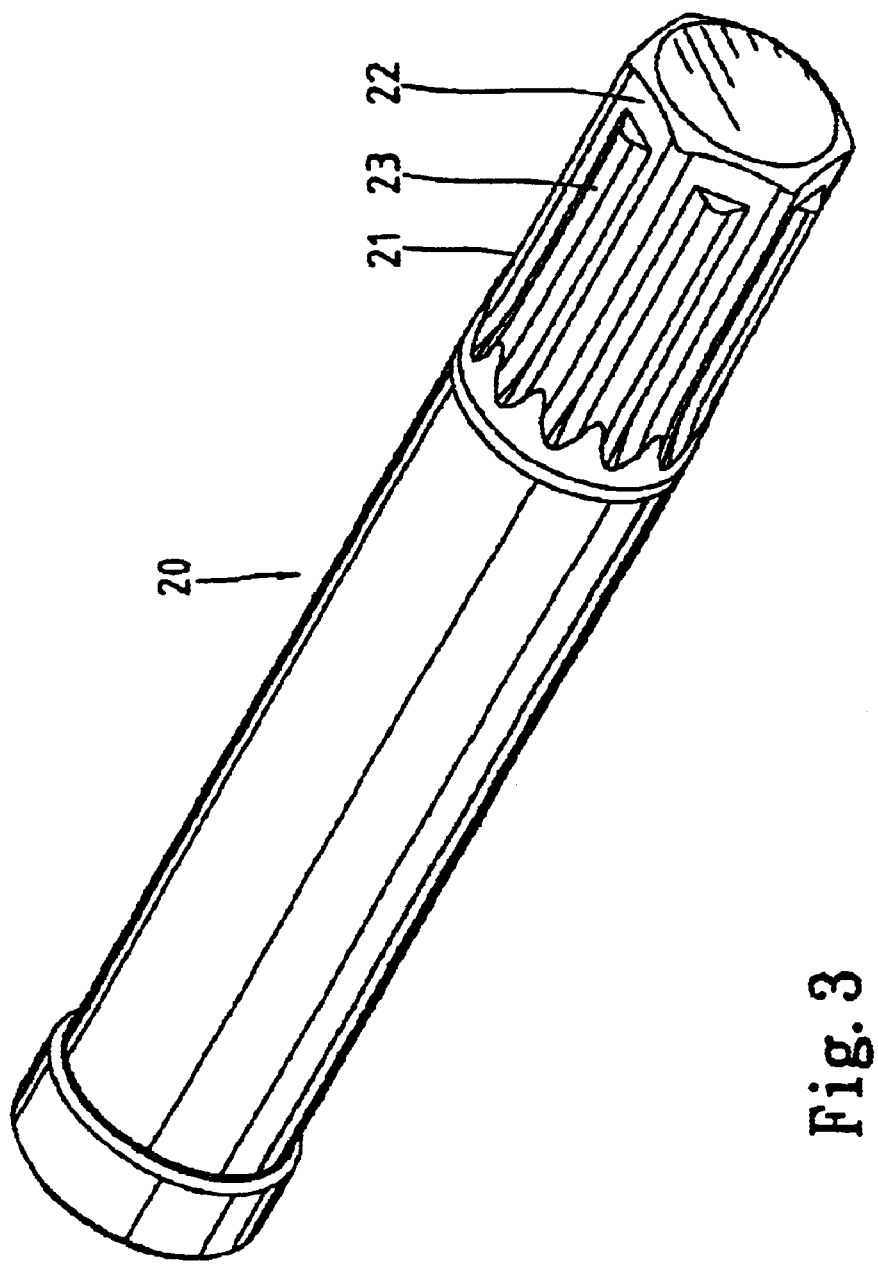
FIGS. 3–7 show various punches used in the process shown in FIG. 1.

In step S4, the work 10 is punched by means of a punch 20 shown in FIG. 3. The punch 20 includes six corners 21 and facets 22 formed on a periphery thereof. Each of the facets 22 is formed with a ridge 23. The ridges 23 are similar to the corners 21 except for being shorter. The work 10 is punched by means of the punch 20 so as to define two recesses 13 and 14 in communication with each other. The recess 13 is complementary to the corners 21 and the facets 22. The recess 14 is complementary to the corners 21, the facets 22 and the ridges 23.

In step S5, the work 10 is punched with another punch (not shown) in order to define a recess 15 with a diameter smaller than that of the recess 13.

In step S6, the work 10 is punched with another punch (not shown) so as to define an opening 16 with a diameter smaller than that of the recess 15. The opening 16 extends through the first end 11 of the work 10. The recess 15 is punched before the opening 16 is punched because the recesses 13 and 14 may be distorted if an opening is punched through the work 10 in a single step.

In step S7, the portion of the work 10 in which the recess 15 and the opening 16 are defined is cut away.

In step S8, the cast article 30 is processed by means of a CNC lathe (not shown) in order to define two annular grooves 41 and 42 in a periphery thereof. The cast article 30 is made an annular semi-product 40.

In step S9, the semi-product 40 is processed so as to define a plurality of longitudinal grooves in the periphery thereof and to form a same number of teeth 51 separated from one another by means of the longitudinal grooves. Thus, the semi-product 40 is made a finished product 50.

Figure 4:
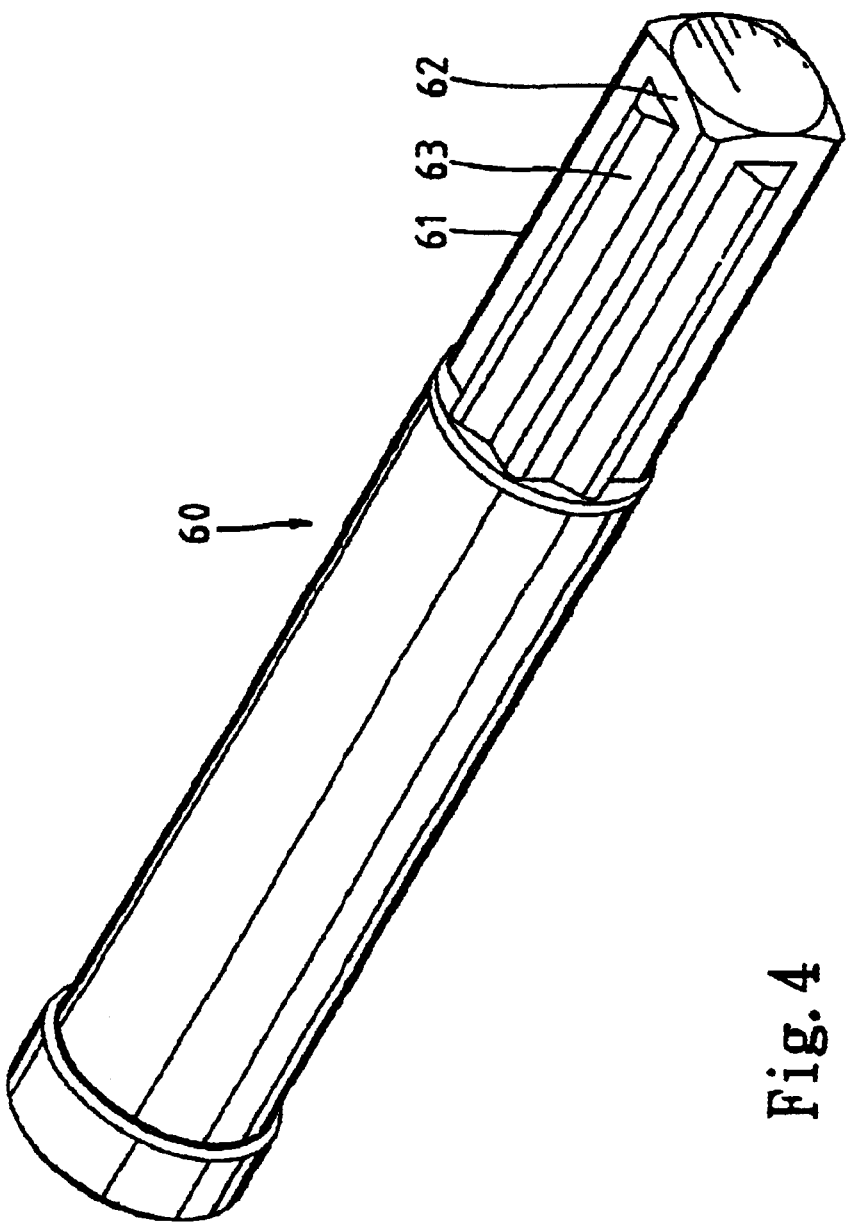

FIG. 4 shows a second punch 60 that can be used in the process shown in FIG. 1. The punch 60 includes four corners 61 and facets 62 formed on a periphery thereof. Each of the facets 62 is formed with a ridge 63. The ridges 63 are similar to the corners 61 except for being shorter.

Figure 5:
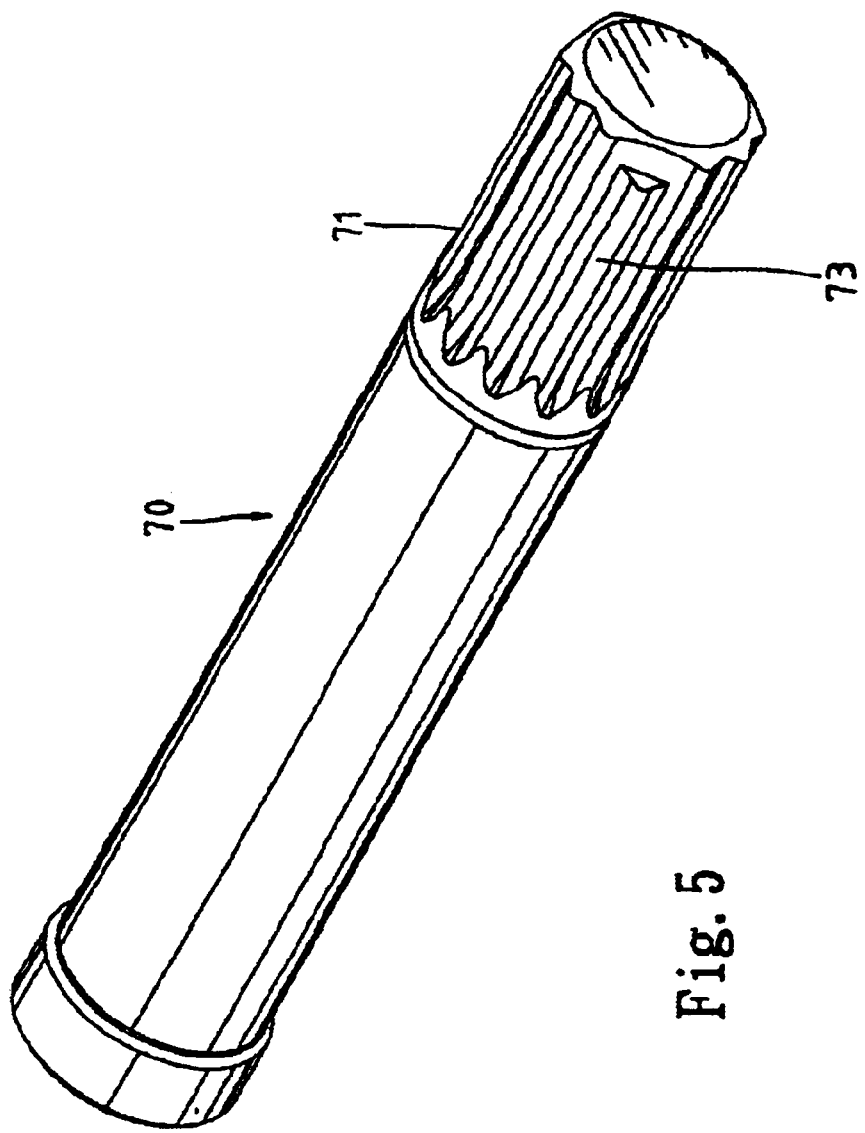

FIG. 5 shows a third punch 70 that can be used in the process shown in FIG. 1. The punch 70 includes eleven ridges 71 and a ridge 73 evenly positioned on a periphery thereof. The ridge 73 is similar to the ridges 71 but being shorter.

Figure 6:
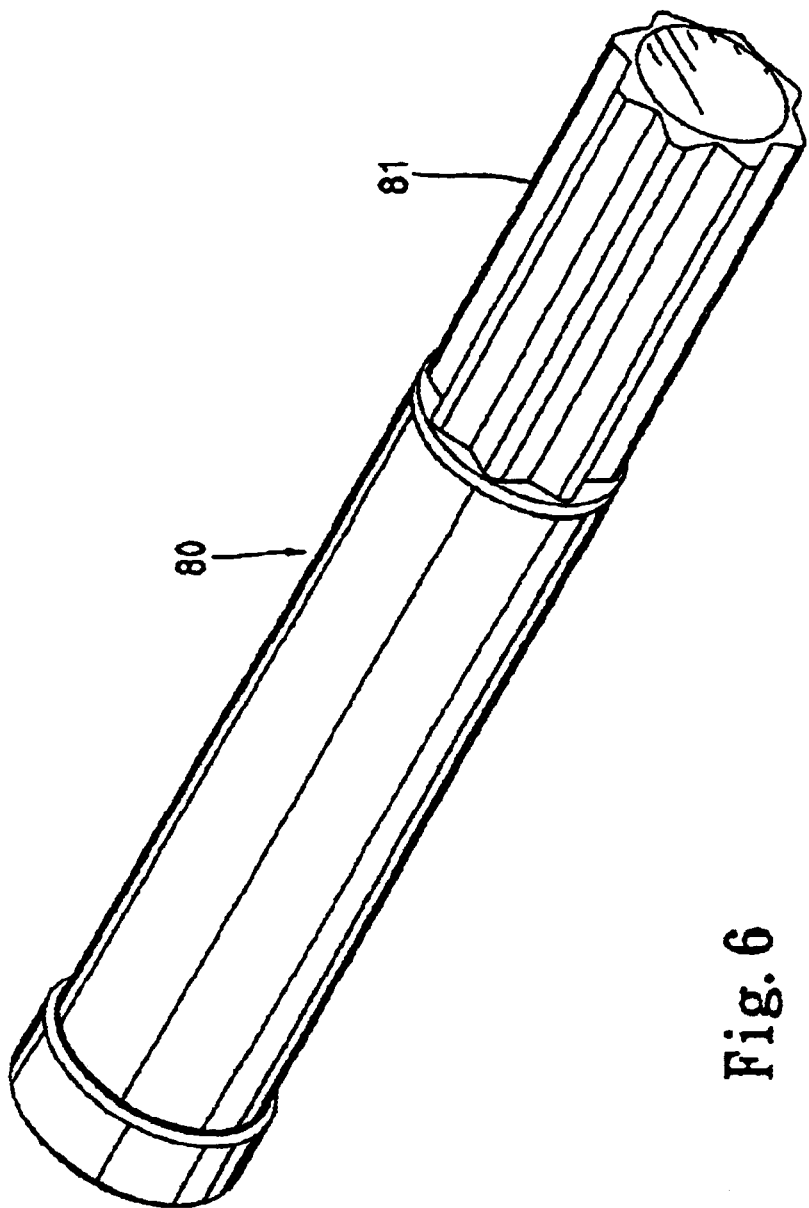

FIG. 6 shows a fourth punch 80 that can be used in the process shown in FIG. 1. The punch 80 includes eight ridges 81 evenly positioned on a periphery thereof.

Figure 7:
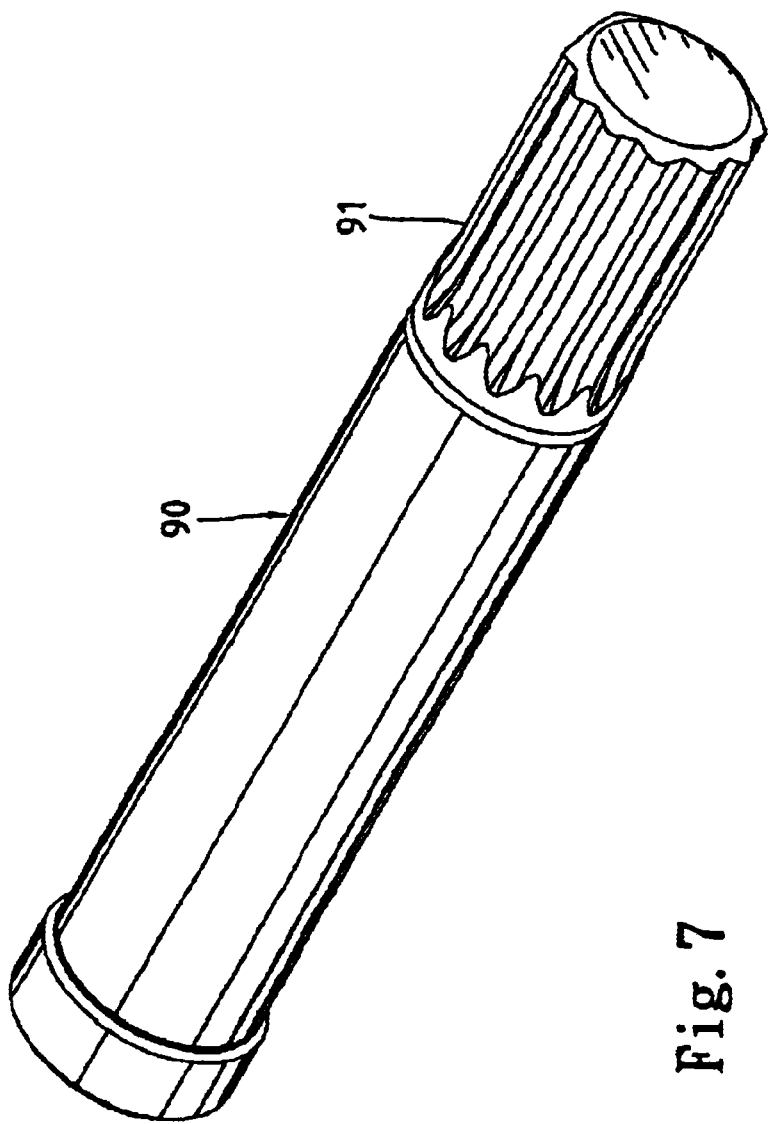

FIG. 7 shows a fifth punch 90 that can be used in the process shown in FIG. 1. The punch 90 includes twelve ridges 91 evenly positioned on a periphery thereof.

The present invention has been described through detailed illustration of the preferred embodiment. Those skilled in the art can derive many variations from the preferred embodiment without departing from the scope of the present invention. Therefore, the preferred embodiment shall not limit the scope of the present invention. The scope of the present invention is defined in the attached claims.

What is claimed is:

1. A process for making ratchet wheels including a step of providing a work (10) with a first end (11) and a second end (12), a step of punching the work (10) by means of a punch so as to define a large recess (13) through the second end (12), a step of cutting away the first end (11) of the work (10), a step of defining two annular grooves (41, 42) in a periphery of the work (10) and a step of forming a plurality of teeth (51) on the work (10).

2. The process according to claim 1 including, before the step of cutting away the first end (11) of the work (10), a step of punching the work (10) in order to define a small recess (15) with a diameter smaller than that of the large recess (13), a step of punching the work (10) so as to define an opening (16) with a diameter smaller than that of the small recess (15) wherein the opening (16) extends through the first end (11) of the work (10).

3. The process according to claim 1 including a step of defining a recess (111) in the first end (11) of the work (10) before the step of defining the large recess (13).

4. The process according to claim 1 including a step of defining a recess (121) in the second end (12) of the work (10) before the step of defining the large recess (13).

5. The process according to claim 1 including a step of forming a chamfer (112) at the first end (11) of the work (10).

6. The process according to claim 1 including a step of forming a chamfer (122) at the second end (12) of the work (10).

7. The process according to claim 1 wherein the two annular grooves (41, 42) are defined by means of a CNC lathe.

8. The process according to claim 1 wherein the teeth (51) formed by cutting a number of grooves in a periphery of the work (10).

9. The process according to claim 1 wherein the punch (20) includes six corners (21), six facets (22) separated from one another by means of the corners (21) and six ridges (23) each formed on one of the facets (22), and the ridges (23) are similar to the corners (21) except for being shorter.

10. The process according to claim 1 wherein the punch (60) includes four corners (61), four facets (62) separated from one another by means of the corners (61) and four ridges (63) each formed on one of the facets (62), and the ridges (63) are similar to the corners (61) except for being shorter.

11. The process according to claim 1 wherein the punch (70) includes eleven long ridges (71) and a short ridge (73) evenly formed thereon.

12. The process according to claim 1 wherein the punch (80) includes eight ridges (81) evenly formed thereon.

13. The process according to claim 1 wherein the punch (90) includes twelve ridges (91) evenly formed thereon.

* * * * *